United States Patent [19]
Persyk et al.

[11] Patent Number: 5,376,797
[45] Date of Patent: Dec. 27, 1994

[54] METHOD AND APPARATUS FOR PRODUCING AND UTILIZING FLASHES OF LIGHT WHICH SIMULATE SCINTILLATION EVENTS

[75] Inventors: Dennis E. Persyk, Barrington; Raymond P. DeVito, Palatine, both of Ill.

[73] Assignee: Siemens Medical Systems, Inc., Iselin, N.J.

[21] Appl. No.: 116,656

[22] Filed: Sep. 3, 1993

[51] Int. Cl.5 .................. G01D 18/00; G01T 1/208; G01T 1/164
[52] U.S. Cl. .................... 250/363.09; 250/252.1
[58] Field of Search .................. 250/363.09, 252.1 R, 250/252.1 A, 363.10

[56] References Cited
U.S. PATENT DOCUMENTS 4,583,187 4/1986 Stoub .................. 364/571.02
4,605,856 8/1986 Persyk et al. .................. 250/363.07
5,004,904 4/1991 Yamakawa et al. .................. 250/207
5,148,029 9/1992 Persyk et al. .................. 250/361 R
5,237,173 8/1993 Stark et al. .................. 250/252.1

FOREIGN PATENT DOCUMENTS 58-2683 1/1983 Japan .................. 250/252.1
59-122986 7/1984 Japan .................. 250/363.04

Primary Examiner—Constantine Hannaher
Attorney, Agent, or Firm—Mark H. Jay

[57] ABSTRACT

Light emitting diodes (LEDs) at fixed locations are placed at the entrance face of the scintillator within the detector head of a scintillation camera system. By energizing the LEDs, surrogate scintillation events may be generated and processed by the scintillation camera system. Information thus acquired can be used to maintain the photodetectors in a well-tuned state, to identify baseline shifts in the preamplifier channels and to determine system deadtime.

11 Claims, 7 Drawing Sheets

METHOD AND APPARATUS FOR PRODUCING AND UTILIZING FLASHES OF LIGHT WHICH SIMULATE SCINTILLATION EVENTS

BACKGROUND OF THE INVENTION

The invention relates to scintillation detectors such as are used in a wide variety applications (e.g. high energy physics, liquid scintillation counters, scintillation camera systems). More particularly, the invention relates to scintillation camera systems which are used to form nuclear medicine images. In its most immediate sense, the invention relates to the detectors which acquire the data used to form nuclear medicine images.

In nuclear medicine, a radioisotope is administered to a patient and the radioisotope is taken up by an organ of interest (e.g. the heart or the brain). As the radioisotope decays, gamma rays are emitted from the patient, collimated by a collimator, and directed to a scintillator (usually a scintillation crystal of NaI(Tl)). The gamma rays interact with the scintillation crystal to form minute flashes of scintillation light ("scintillation events"). Photomultiplier tubes are arranged to detect these scintillation events and to convert them to electrical signals. These signals are then used to reconstruct an image of the patient.

Photomultiplier tubes are not stable; the gains of such tubes change as the tubes age and in accordance with the conditions under which the tubes are operated. It has long been recognized that the performance of scintillation camera systems can be improved by controlling the gains of the photomultiplier tubes. U.S. Pat. No. 4,583,187 discloses a system which does this; the system is marketed under the DIGITRAC trademark by Siemens Gammasonics, Inc., assignee of the present application.

Even though the DIGITRAC system is highly accurate and successful at controlling the photomultiplier tube gain over the long term, short term variations in the performance of the photomultiplier tubes in a conventional scintillation camera system cause the system to be in a detuned state at any particular time. The camera must consequently be periodically retuned. This takes time, requires the services of technical personnel and makes the system unavailable for clinical use. It would therefore be advantageous to provide a system which could maintain a properly-tuned state of a scintillation camera detector.

One object of the present invention is to provide apparatus which can be used to monitor the performance of a system which utilizes a scintillator as a radiation detector. Another object is to provide a system which will maintain a scintillation camera system in a well-tuned state. Still a further object is, in general, to improve on known apparatus of this general type.

In accordance with the invention, at least one light-emitting device is in optical communication with the entrance face of a scintillator, so that light emitted by the light-emitting device passes through the scintillator before becoming incident on, e.g., a photodetector such as a photomultiplier tube.

In accordance with method aspects of the invention, the photodetector array of a scintillation camera is exposed to flashes of simulated scintillation light from fixed locations at the entrance face of the scintillator. The flashes of light mimic scintillation flashes and are processed by the camera as if they were produced by scintillation events. When the detector is in a well-tuned state, the apparent locations of thus-produced surrogate "scintillation events" are registered and used as benchmarks. Subsequent changes in such apparent locations from the registered benchmark locations may then be used to identify, and to correct, de-tuning of the detector.

In accordance with apparatus aspects of the invention, light-emitting devices are incorporated within the detector of a scintillation camera system. In further accordance with the invention, the light-emitting devices are energized to generate surrogate scintillation events which are processed by the scintillation camera system as if they were gamma ray-generated scintillation events. Advantageously, the light-emitting devices are light-emitting diodes ("LEDs") and are located adjacent the entrance face of the scintillator. As is discussed below, by energizing the LEDs, changes in the state of tune of the detector can be identified and the detector can then be retuned to a well-tuned state.

Significantly, the invention differs from apparatus advertised by General Electric under the AUTOTUNE trademark. In the General Electric apparatus, an LED is mounted to each photomultiplier tube and the light output of that LED is made directly incident upon that photomultiplier tube. The gain of each photomultiplier tube (or the corresponding preamplifier) is individually adjusted so as to keep the output from the tube at a predetermined level when the LED is energized. In accordance with the preferred embodiment of the present invention, the LEDs are mounted to the entrance face of the scintillator and the light from the LEDs passes through the scintillator before becoming incident upon the photomultiplier tubes. Furthermore, each LED is in optically operative relationship with more than one photomultiplier tube because light from each LED reaches more than one photomultiplier tube after passing through the scintillator.

BRIEF DESCRIPTION OF THE DRAWINGS

The invention will be better understood with reference to the following illustrative and non-limiting drawings, in which.

DETAILED DESCRIPTION OF PREFERRED EMBODIMENT

The description below refers to a scintillation camera system because the assignee of this patent application is in the business of manufacturing such systems. However, the invention is suitable for use in any system which utilizes a scintillator as a radiation detector. Systems of this sort are used for high energy physics, in liquid scintillation counting, and other non-medical applications.

The following description assumes that the scintillation camera detector is initially adjusted to an acceptable state of tuning. Once this has been done, the preferred embodiment of the invention can be used to maintain that state of tuning.

Figure 1:
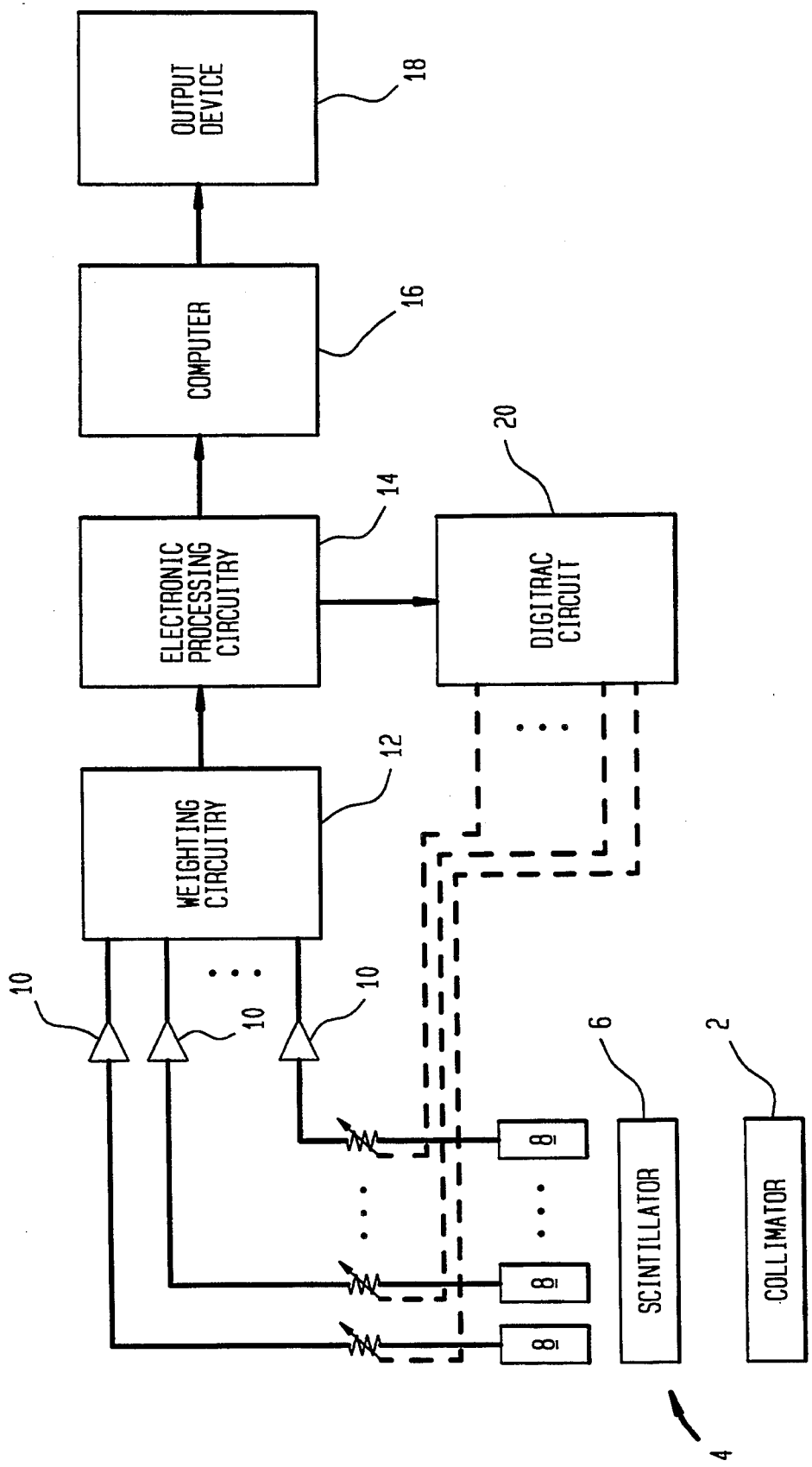
FIG. 1 is a schematic diagram which illustrates scintillation camera systems of a known type.
Figure 2:
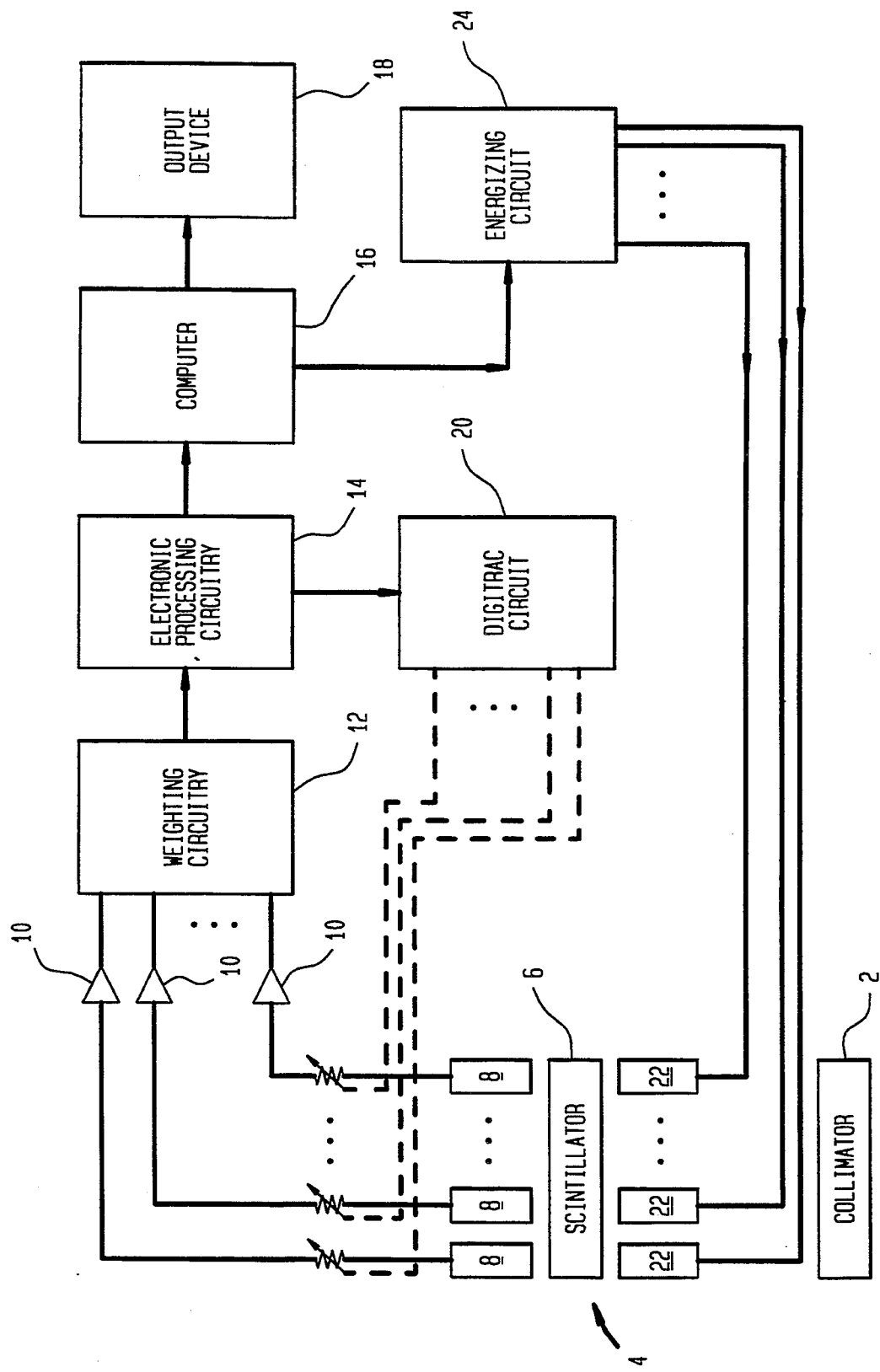
FIG. 2 is a schematic diagram which illustrates apparatus in accordance with a preferred embodiment of the invention.

In the detector of a conventional scintillation camera system such as is schematically illustrated in FIG. 1, gamma rays collimated by a collimator 2 become incident upon the entrance face 4 of a scintillator 6 (typically, but not necessarily, NaI(TL)). An array of photomultiplier tubes ("PMTs") 8 are mounted at the exit face of the scintillator 6 and are optically coupled to the scintillator 6. (A masked light pipe—not shown—may be interposed between the scintillator and the PMTs 8. Nonetheless, the PMTs 8 and the scintillator 6 are optically coupled.) When the gamma rays interact with the scintillator 6, minute flashes of scintillation light (not shown) occur in the scintillator 6. These flashes, which are also known as "scintillation events", cause the PMTs 8 to produce electrical signals at their outputs. From such signals, the locations and intensities of the scintillation events can be determined. Typically, the signals are directed through preamplifiers 10 and weighting circuitry 12 to electronic processing circuitry 14 and thence to a computer 16, which uses the information in the signals to reconstruct an image of a portion (not shown) of a patient's body. The image may then be output to an output device 18 such as a display or an imager, or may alternatively be used for tomographic reconstruction.

The PMTs 8 are not stable; the gains of the PMTs 8 change over time and with the conditions under which the PMTs 8 are operated. For example, aging, changes in temperature inside the detector, changes in the magnetic field surrounding the PMTs 8 caused by rotation of the detector within the earth's magnetic field and changes in count rate upon commencement of a study all cause the gains of the PMTs 8 to change. For this reason, scintillation camera systems manufactured by Siemens Gammasonics, Inc., assignee of the present application, incorporate a DIGITRAC circuit 20 which operates in accordance with U.S. Pat. No. 4,583,187. The DIGITRAC circuit 20 adjusts the gains of the PMTs 8 in parallel to maintain the PMTs 8 in a well-tuned state over the long term. This is shown in a schematic manner in the Figures by showing variable resistances in series with each of the PMTs 8 and by showing a dotted-line control connection between each such variable resistance and the DIGITRAC circuit 20; it will be understood that there is no such resistance and that the DIGITRAC circuit 20 does not operate by varying resistances at the outputs of the PMTs 8.

Although the DIGITRAC circuit 20 works quite well over the long term, the PMTs 8 can over the short term deviate from a well-tuned state. (The above-stated effects of temperature changes, count rate changes, and rotation of the detector head are short-term changes for which the DIGITRAC circuit 20 does not compensate.) This is because the DIGITRAC circuit 20 only adjusts the gains of the PMTs 8 at intervals determined by the number of events processed, and there can be a comparatively long time between such adjustments. When this happens, the PMTs 8 respond less uniformly to scintillation events within the scintillator 6 and the detector becomes detuned. As this happens, the image formed by the scintillation camera system becomes degraded.

Figure 3:
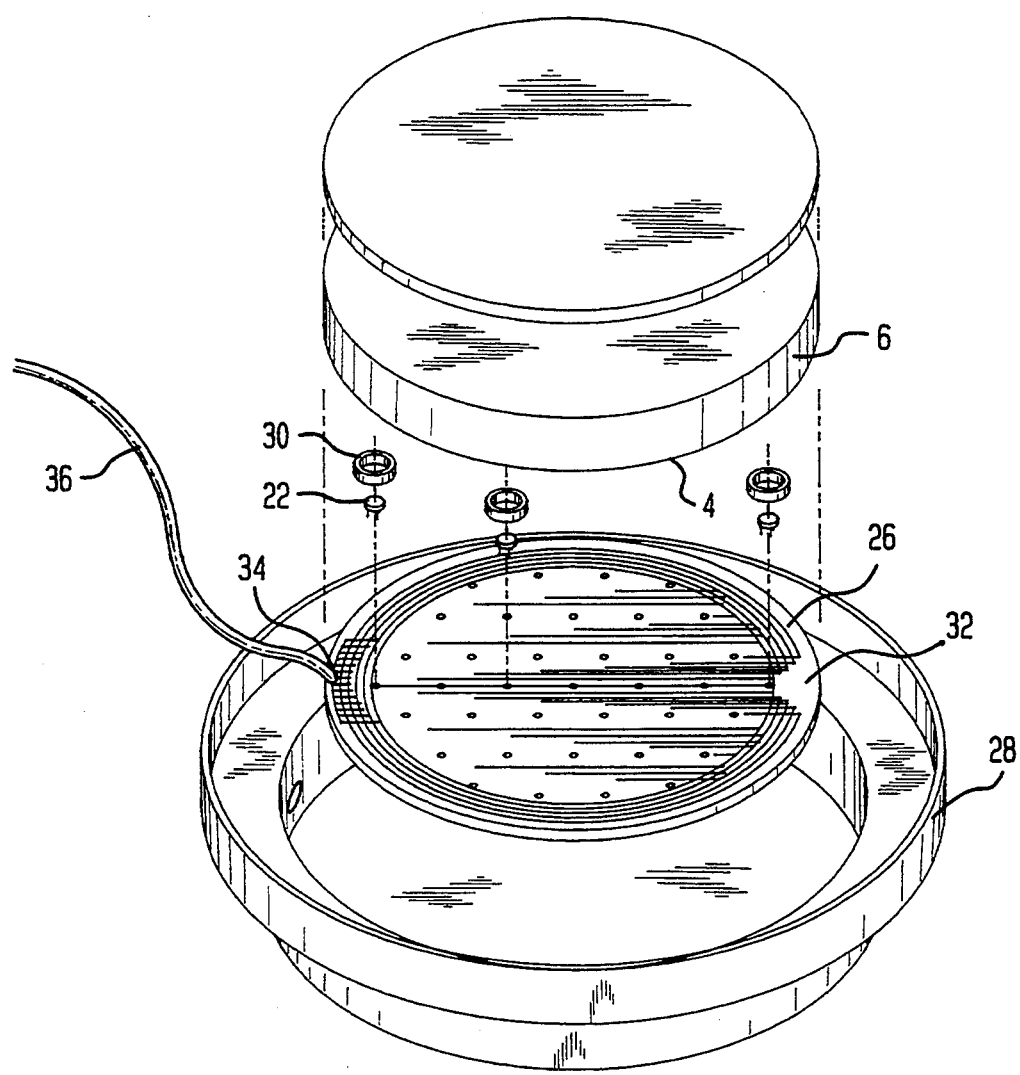
FIG. 3 is a schematic drawing showing a portion of apparatus in accordance with a preferred embodiment of the invention.

In accordance with the present invention, surrogate scintillation events are generated by at least one light-emitting device 22, each of which is in optical communication with the entrance face 4 of the scintillator 6. (In the preferred embodiment, there are—see below as—many light-emitting devices 22 as there are PMTs 8, but this is only preferred.) Each of the light-emitting devices 22 is at a fixed location and because the light output from each of the light-emitting devices 22 passes through the scintillator 6 to the array of PMTs 8, each light-emitting device 22 is in operative optical relationship with more than one of the PMTs 8. Advantageously, and in accordance with the preferred embodiment, the light-emitting devices 22 are light-emitting diodes ("LEDs") of the surface mount type and are (see FIG. 3) mounted on a printed circuit board 26 which is located adjacent the entrance face of the scintillator 6. (FIG. 3 is not to scale, but is rather enlarged for clarity. The details of the printed circuit board 26, the LEDs 22 and the manner in which the LEDs 22 are energized will be discussed below.) Further advantageously, there are as many LEDs 22 as PMTs 8.

In further accordance with a preferred embodiment of the invention, the existing circuitry 14 of the scintillation camera system is used to compute the apparent locations of the LEDs 22. To do this, the LEDs 22 are so energized by an energizing circuit 24 as to mimic the amplitude and duration of a scintillation event. When an LED 22 is energized, the light emitted from the LED 22 passes through the scintillator 6 and is detected by the PMTs 8. The PMTs 8 then produce output signals, just as they would if they were responding to scintillation events within the scintillator 6 rather than flashes of light emitted from the LEDs 22 and transmitted through the scintillator 6. Since the circuitry 14 determines the locations of detected scintillation events on the basis of the amplified and processed output signals from the PMTs 8, the apparent locations of the LEDs 22 can also be determined by the circuitry 14 when the LEDs 22 are energized by the energizing circuit 24.

When the scintillation camera detector is in a well-tuned state, the apparent locations of the LEDs 22 will correspond to the actual locations of the LEDs 22. However, when the tuning of the detector becomes degraded, the apparent locations of the LEDs 22 will be displaced from their actual locations. These displacements, taken as a whole, constitute a map of system gain errors.

Figure 4:
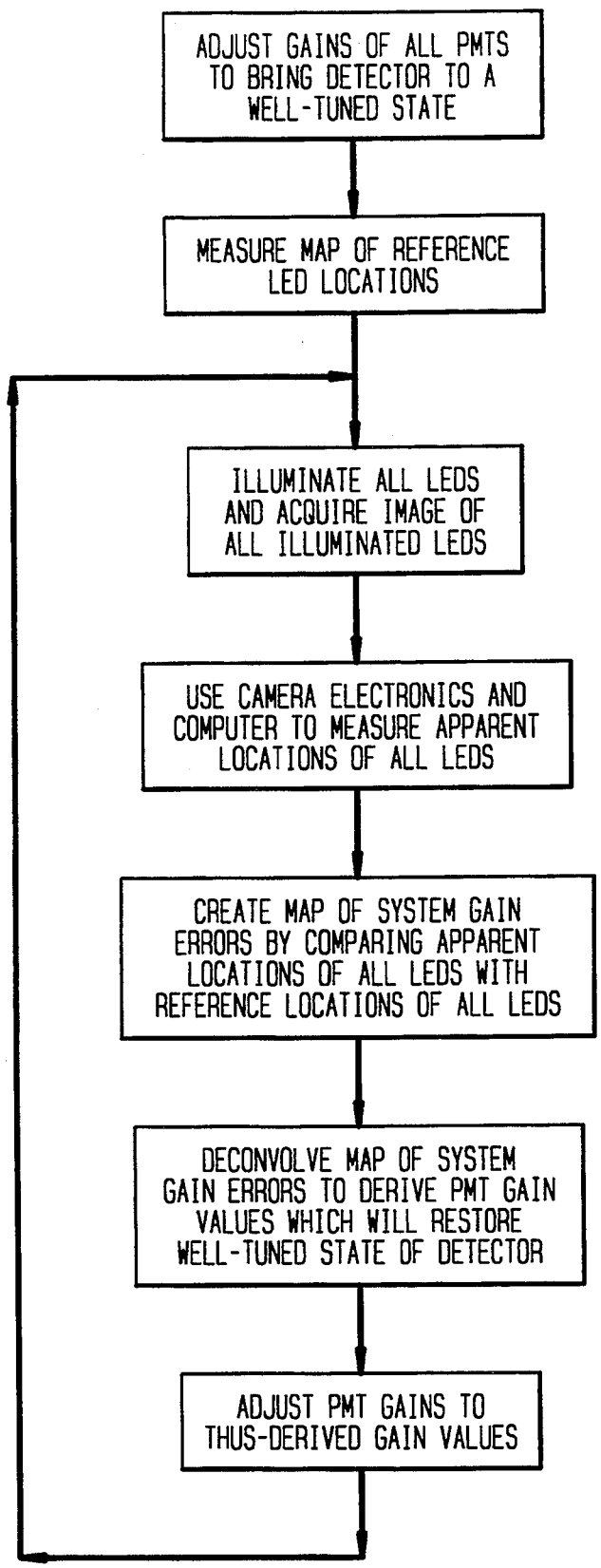
FIG. 4 is a flow chart showing a method in accordance with the preferred embodiment of the invention.
Figure 5:
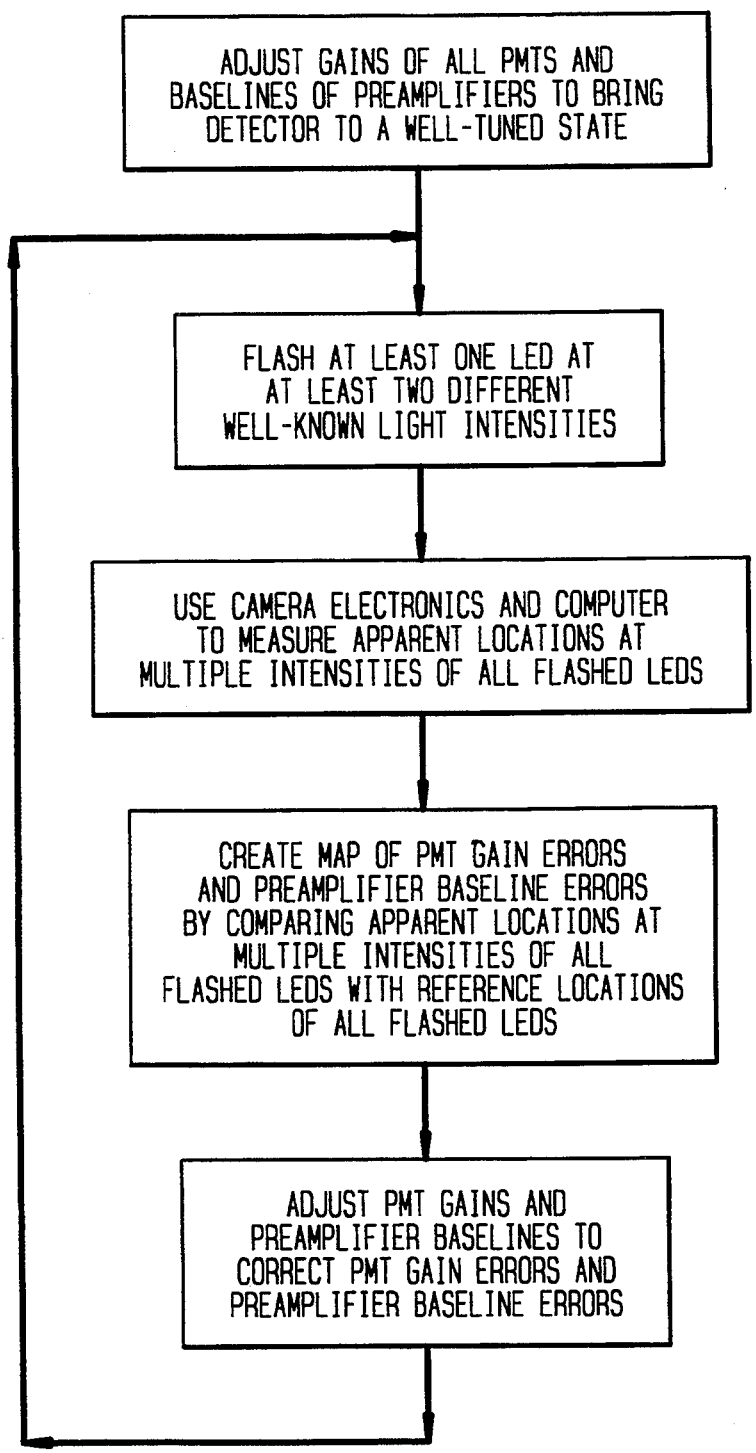
FIG. 5 is a flow chart showing another method in accordance with the preferred embodiment of the invention.
Figure 6:
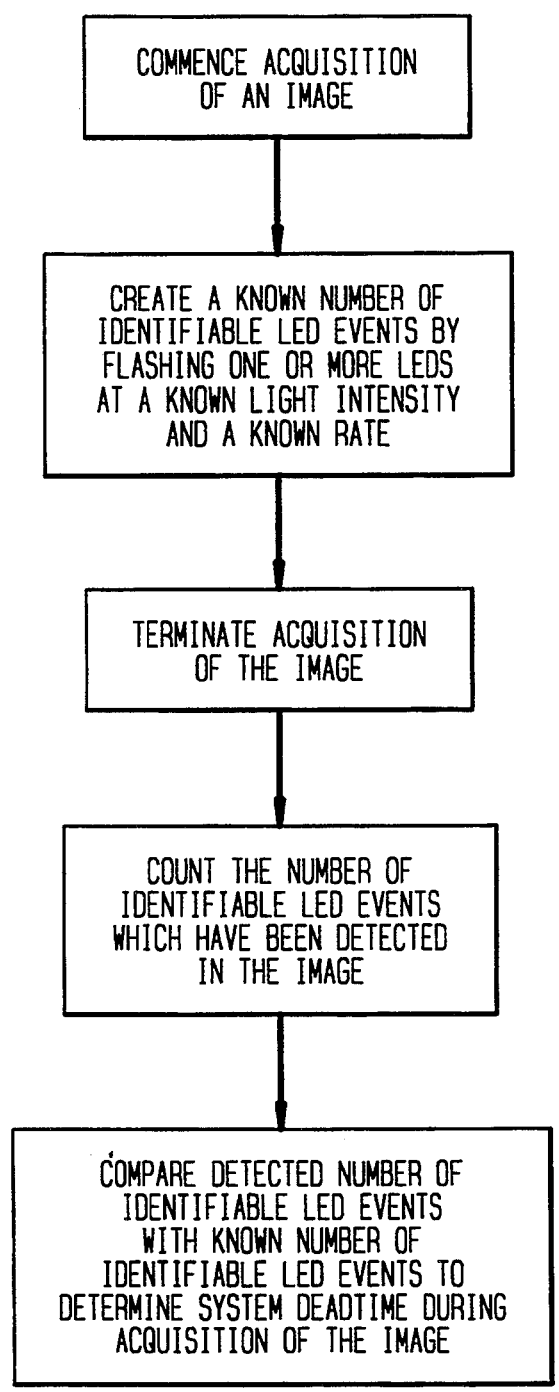
FIG. 6 is a flow chart showing still another method in accordance with the preferred embodiment of the invention.

In accordance with the preferred embodiment of the invention, the DIGITRAC circuit 20 is used to readjust the gains of the PMTs 8 in such a manner that the apparent locations of the LEDs 22 (as determined by the circuitry 14) are relocated to correspond to their actual locations. In other words, the DIGITRAC circuit 20 performs the same deconvolution and gain adjustment functions as before, but on the basis of different image data and using a different mathematical algorithm; in accordance with the present invention, the data input is image data relating to the apparent locations of the LEDs 22. This is shown in general terms in FIG. 4; the details of the actual deconvolution scheme are discussed below.

The preferred embodiment of the invention is robust; it works even when some of the LEDs 22 fail and when the light outputs of the LEDs 22 vary (it is known that light output of an LED varies with temperature). Let it be assumed that there are 37 PMTs 8 and 37 LEDs 22. Where the locations of all the LEDs 22 are measured, 74 variables will be established: 37 x coordinates and 37 y coordinates. Since in accordance with the preferred embodiment of the invention this information is used to compute 37 variables (the gains of each of the 37 PMTs 8) there is a substantial redundancy in the measured data and the invention will produce acceptable results even if a few of the LEDs 22 fail. Furthermore, since the preferred embodiment relies upon changes in apparent location of the LEDs 22 to determine detuning of the PMTs 8, changes in the light output of the LEDs 22 have little effect on the accuracy of this determination.

It will therefore be understood that in accordance with the preferred embodiment of the present invention, the DIGITRAC circuit 20 is used to maintain the PMTs 8 in a well-tuned state even in the short term.

In further accordance with the preferred embodiment of the invention, it is possible to empirically determine changes in the baselines of the preamplifiers 10. This is done by using the energizing circuitry 24 to energize the LEDs 22 at significantly different levels (e.g. at the light equivalents of approximately 100 keV and 400 keV) and then determining, using circuitry 14, what changes this causes to the apparent locations of the LEDs 22. This in turn is done by initially determining the apparent locations of the LEDs 22 at a high brightness level (perhaps 400 keV equivalent). At this level, gain errors of the PMTs 8 will be the predominant source of shifts in the apparent locations of the LEDs 22 and can be corrected by appropriately retuning the PMTs 8. Once the gains of the PMTs 8 have been appropriately adjusted, the apparant locations of the LEDs 22 can be determined a second time but at a low brightness level (perhaps 100 keV). At this low brightness level, the predominant source of shifts in the apparent locations of the LEDs 22 will be baseline shifts in the preamplifiers 10. These baseline shifts can then be corrected. (It will be understood that in the initial—high brightness—determination, there is a correction for multiplicative-type errors, while in the later—low brightness—determiniation, there is a correction for additive-type errors. Where the PMTs 8 or the preamplifiers 10 are greatly mistuned, it may be necessary to iterate this correction process, repeating corrections until the detector has reached a state of acceptable tune.) In the preferred embodiment, this can be done at the same time as the short-term gain changes of the PMTs 8 is determined by using the computer 16 to suitably control the energizing circuitry 24.

In further accordance with the preferred embodiment of the invention, it is possible to empirically determine the deadtime of the scintillation camera system during the acquisition of an image. This is done by creating identifiable LED events and then determining the percentage of those events which are actually included in a particular data acquisition. To do this, an image acquisition is commenced and the energizing circuit 24 is used to energize one or more of the LEDs 22 at a known light output and at a known rate. The acquisition is then concluded. By comparing the number of LED flashes produced by the energizing circuit 24 with the number of LED events which are detected in the image, the system deadtime can be determined. The final image can then be corrected for deadtime by using a single multiplier.

Figure 7:
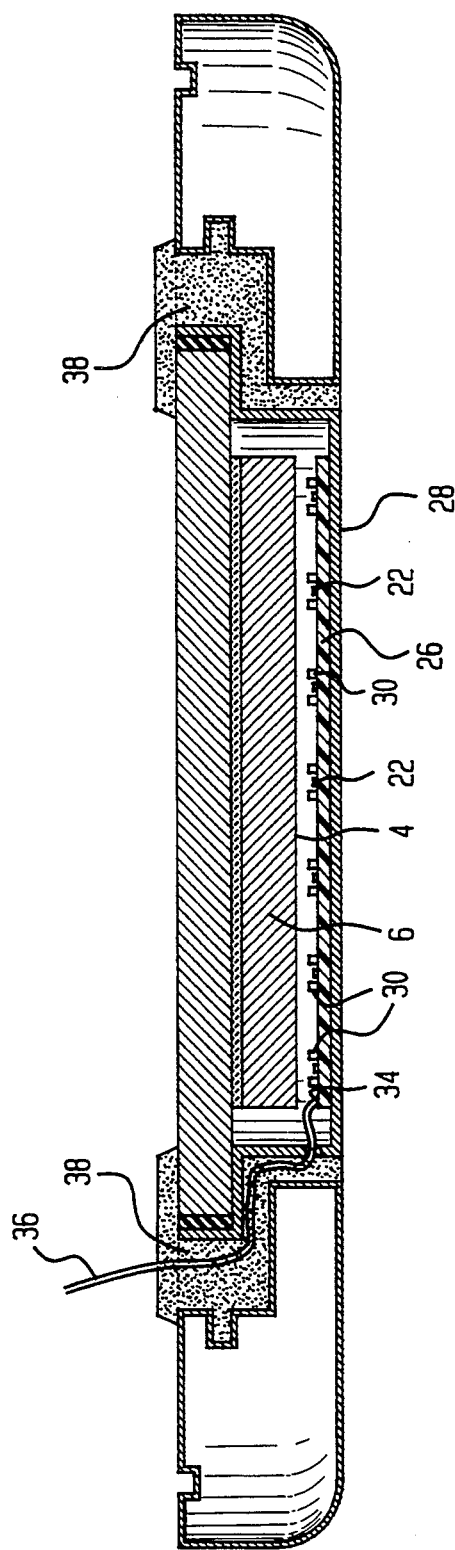
FIG. 7 is a schematic drawing showing a portion of apparatus in accordance with a preferred embodiment of the invention.

As stated above, each of the LEDs 22 is in optical communication with the entrance face 4 of the scintillator 6 (see FIGS. 3 and 7). This is accomplished by placing the printed circuit board 26 inside the sealed cannister 28 in which the scintillator 6 is enclosed, with the LEDs 22 facing the scintillator 6 and being spaced therefrom by approximately 1 mm of air. (In most scintillation camera systems, the scintillator 6 is a block of NaI(Tl), which is hydroscopic and which develops a surface hydrate and eventually becomes unusable when exposed to water vapor in the air. For this reason, NaI(Tl) scintillators are conventionally sealed in cannisters from which all water vapor has been purged.) To prevent the LEDs 22 from damaging the scintillator 6 as a result of handling the cannister 28, washer-shaped pads 30 are mounted to the printed circuit board 26 such that each surrounds a corresponding one of the LEDs 22. (The pad 30 is advantageously an RTV rubber with a reflective material therein; in the preferred embodiment the pad 30 is 50% by volume RTV rubber and 50% white reflective material such as $Al_2O_3$ $TiO_2$ or MgO. The reflective material directs stray light back into the scintillator. However, the reflective material need not be included in the pads 30 if the interior of the cannister 28 and the pads 30 are coated with a reflective material.) The printed circuit board 26 supplies power to the LEDs 22 via copper conductors 32, which as much as possible are run circumferentially around the entrance face 4 of the scintillator 6. This is to prevent the conductors 32 from being imaged by the scintillation camera. The copper conductors 32 terminate at a peripheral region 34, where insulated wires 36 from the outside are connected to establish the necessary connections between the LEDs 22 and the energizing circuit 24. The insulated wires 36 are embedded in the epoxy seal 38 which is used to seal the cannister 28. (FIG. 7 is taken from U.S. Pat. No. 5,148,029; at present, the structure of the therein-disclosed scintillation camera module is believed to be the best way of implementing the preferred embodiment of apparatus in accordance with the present invention.)

The interior of the cannister 28 must remain well sealed to prevent water vapor from entering. To this end, the printed circuit board 26 is advantageously of a material (FR4) which does not retain water. Additionally, the insulation on the insulated wires 36 is advantageously that which is manufactured under the FORMVAR trademark. This material is not water-permeable and therefore prevents "wicking" of water vapor into the cannister 28. Furthermore, the insulated wires 36 are so routed that they are completely surrounded by the epoxy seal 38; the insulation on the insulated wires 36 does not touch the cannister 28.

In the preferred embodiment, the LEDs 22 are not optically coupled to the scintillator 6, but are (see above) spaced therefrom. This is not required for the practice of the invention and for some applications it would be preferable to have the LEDs 22 optically coupled to the scintillator 6. However, the above-disclosed structure is preferred because it is more conveniently manufactured.

As stated above, the energizing circuit 24 energizes the LEDs 22 in such a manner as to accurately replicate flashes of scintillation light. In practice, this has proven to be difficult to achieve because most LEDs have decay times which are much longer than the 230 microseconds decay time of a scintillation event. In the preferred embodiment, successful results have been achieved by using LEDs of the GaP or GaAsP types (which have comparatively short decay times) and energizing them with a sharp current spike which is of insufficient duration to turn the LEDs fully on.

As stated above, the DIGITRAC circuit 20 is used to change the gains of the PMTs 8. It would be possible to use the algorithm disclosed in U.S. Pat. No. 4,583,187 to do this, but this would be disadvantageous because this algorithm would not produce the proper results if any of the LEDs 22 were to fail. Advantageously, the following algorithm would be used instead (a detector having 37 PMTs 8 is assumed):

1) Each of the LEDs 22 is flashed and conventional Anger arithmetic is used to compute the x and y coordinates of each LED. Since the x coordinate of an event is given by $$\frac{\sum_i x_j n_i}{\sum_i n_i}$$

where $x_j$ is the position coordinate for the jth PMT and $n_j$ is the signal output from the jth PMT, this calculation step would produce 37 computed x coordinates as follows:

$$x^1 = \frac{\sum_i x_j n_i^1}{\sum_i n_i^1}$$

$$\vdots$$

$$x^{37} = \frac{\sum_i x_j n_i^{37}}{\sum_i n_i^{37}}$$

2) If the gains of the PMTs 8 were perfect, the computed x coordinates would exactly coincide with the proper x coordinates of the locations of the LEDs. However, this will likely not be so, and each computed x coordinate would be erroneous by a quantity $$\Delta x_n = x_{ideal}^n - x_{measured}^n$$

It would then be possible to define a total error vector $\vec{\Delta x}$ as:

$$\vec{\Delta x} = \begin{bmatrix} \Delta x^1 \\ \vdots \\ \Delta x^{37} \end{bmatrix}$$

3) The corresponding gain errors $\Delta G^n$ of the 37 PMTs 8 could then be used to express a total gain error vector $$\vec{\Delta G} = \begin{bmatrix} \Delta G^1 \\ \vdots \\ \Delta G^{37} \end{bmatrix}$$

4) There is a relationship between the ith LED 22 and the jth PMT 8; this relationship $C_{ij}$ may be called the contribution matrix and can be measured by flashing the ith LED 22, changing the gain of the jth PMT 8 and noting the location variation of the ith LED 22. The overall contribution matrix $\overline{C}$ is then:

$$\overline{C} = \begin{bmatrix} c_{1,1} & \cdots & c_{1,37} \\ \vdots & & \vdots \\ c_{37,1} & \cdots & c_{37,37} \end{bmatrix}$$

5) The measurement errors $\vec{\Delta x}$ are related to the gain error vector $\vec{\Delta G}$ by a linear convolution, so that $$\vec{\Delta X} = C_x \vec{\Delta G}$$

6) The gain shift can be deconvolved from the position errors $\Delta x^n$ by calculating an inverted contribution matrix $\overline{D}_x$ such that $$\overline{1} = \overline{D}_x \overline{C}_x$$

7) The individual gain errors $\Delta G_n$ can then be calculated by $$\vec{\Delta G} = D_x \vec{\Delta x}$$

8) Likewise, the measurement errors $\Delta y$ are related to the same gain error vector $\Delta G$ by the linear convolution $$\vec{\Delta y} = C_y \vec{\Delta G}$$

9) The equations from 5) and 8) above can be combined into one overdetermined system of equations such that $$\begin{pmatrix} \vec{\Delta x} \\ \vec{\Delta y} \end{pmatrix} = \begin{pmatrix} C_x \\ C_y \end{pmatrix} \vec{\Delta G}$$

The left side of this equation is a 74 element vector. The composite matrix on the right side is a (74×37) matrix and $\vec{\Delta G}$ is a 37 element vector.

10) To solve this linear system of equations, where there are at least as many equations as unknowns, the least squares solution vector is computed using a Singular Value Decomposition of the combined contribution matrix.

It will be understood that calculations in the same form can be used to compute the gain errors which apply to computation of the y coordinates of the LEDs 22. Thus, the mathematical solution is "overdetermined" as stated above; although 74 variables (37 x coordinates and 37 y coordinates) are available for the calculation, only 37 variables (gains of 37 PMTs 8) need be computed.

This method is not restricted to Anger positioning, but rather is applicable to any positioning algorithm where location is a function of the gain of a plurality of PMTs or other light detecting devices.

Although a preferred embodiment has been described above, the scope of the invention is limited only by the following claims:

We claim:

1. A scintillation camera detector, comprising:
   a scintillator with an entrance face and an exit face;
   a plurality of photodetectors placed adjacent said exit face and being optically coupled to the scintillator; and
   a plurality of light-emitting devices, each being adjacent said entrance face and in operative optical relationship with more than one of said photodetectors.

2. The scintillation camera detector of claim 1, wherein said light-emitting devices are GaP LEDs.

3. The scintillation camera detector of claim 1, wherein said light-emitting devices are GaAsP LEDs.

4. The scintillation camera detector of claim 1, wherein said light-emitting devices are mounted upon a printed circuit board, and wherein said scintillator and said printed circuit board are contained within a sealed container.

5. A scintillation camera system, comprising:
   a scintillator with an entrance face and an exit face;
   a plurality of photodetectors placed adjacent said exit face and being optically coupled to the scintillator, each of said photodetectors producing an output signal;
   means for processing said output signals;
   means, connected to said processing means, for displaying an image; and
   a plurality of light-emitting devices, each light-emitting device being placed at said entrance face and being in operative optical relationship with more than one of said photodetectors.

6. A scintillation camera system having an array of gain-controlled photomultipliers, comprising:
   a collimator for collimating gamma radiation and directing it to an entrance face of a scintillator;
   a scintillator for converting incident gamma radiation into scintillation events, said scintillator having an entrance face and an exit face;
   an array of photomultipliers being placed at said exit face and being optically coupled to the scintillator, each of the photomultipliers having an output and an adjustable gain;
   an array of light-emitting diodes, each light-emitting diode being at a fixed location adjacent said entrance face;
   means for energizing at least some of the light-emitting diodes in said array thereof;
   means for calculating, from signals at the outputs of the photomultipliers in said array thereof, positions of the light-emitting diodes;
   means for determining, from positions calculated by said calculating means, a map of system gain errors;
   means for deconvolving said map of system gain errors to derive therefrom a set of photomultiplier gains which will, within a predetermined tolerance, correct for said map of system gain errors; and
   means for adjusting the gains of the photomultipliers in said array thereof in such a manner as to cause said gains to be equal to the gains in said derived set of photomultiplier gains.

7. A scintillation camera system having an array of gain-controlled photomultipliers, comprising:
   a collimator for collimating gamma radiation and directing it to an entrance face of a scintillator;
   a scintillator for converting incident gamma radiation into scintillation events, said scintillator having an entrance face and an exit face;
   an array of photomultipliers being placed at said exit face and being optically coupled to the scintillator, each of the photomultipliers having an output and a known adjustable gain;
   an array of preamplifier channels, each connected to at least one of the photomultipliers and having an output and an adjustable baseline;
   an array of light-emitting diodes, each light-emitting diode being at a fixed location adjacent said entrance face;
   means for energizing the light-emitting diodes in said array thereof, said means for energizing operating to energize at least some of said light-emitting diodes at at least two energies;
   means for calculating, from signals at the outputs of the preamplifier channels, a map of shifts in said gains and said baselines;
   means for deconvolving said map of baseline and gain shifts to derive therefrom a set of photomultiplier gains which will, within a predetermined tolerance, correct for said map of gain and baseline shifts; and
   means for varying the gains of the photomultipliers in said array thereof in such a manner as to cause said gains to be equal to the gains in said derived set of photomultiplier gains.

8. A system for measuring system deadtime of a scintillation camera system during acquisition of nuclear medicine data, comprising:
   a collimator for collimating gamma radiation and directing it to an entrance face of a scintillator;
   a scintillator for converting incident gamma radiation into scintillation events, said scintillator having an entrance face and an exit face;
   an array of photomultipliers being placed at said exit face and being optically coupled to the scintillator, each of the photomultipliers having an output and an adjustable gain;
   an array of light-emitting diodes adjacent said entrance face;
   means for energizing at least some of the light-emitting diodes in said array thereof at a known light output and a known rate to generate LED events;
   means for forming, from signals at the outputs of the photomultipliers in said array thereof, a nuclear medicine image; and
   means for comparing a number of LED events included in a nuclear medicine image to a number of LED events generated for said image.

9. A method for determining the state of a scintillation camera detector, comprising the step of generating at least one surrogate scintillation event using at least one light-emitting element which is located adjacent an entrance face of a scintillator within said detector.

10. The method of claim 9, wherein said generating step includes the step of energizing said at least one light-emitting element at at least two different energies.

11. A method for measuring the system deadtime of a scintillation camera system, comprising the following steps:
   generating, during an acquisition of an image, a plurality of identifiable events by energizing a light-emitting element which is located adjacent an entrance face of a scintillator within said detector head; and
   counting the number of such identifiable events which are contained within said image during acquisition thereof.

* * * * *